United States Patent [19]

Piazza et al.

[11] Patent Number: 5,068,665
[45] Date of Patent: Nov. 26, 1991

[54] ARCHITECTURE FOR THE IMPLEMENTATION OF RADAR DISPLAYS

[76] Inventors: Francesco Piazza, Via Loik, 7, Jesi (AN); Antonio Pierfederici, Via XXIV Maggio, 32, San Michele Al Fiume (PS), both of Italy

[21] Appl. No.: 681,403

[22] Filed: Apr. 4, 1991

Related U.S. Application Data

[63] Continuation of Ser. No. 413,223, Sep. 27, 1989, abandoned.

[30] Foreign Application Priority Data

Sep. 29, 1988 [IT] Italy ..................... 630 A/88

[51] Int. Cl.$^5$ ............................. G01S 7/04
[52] U.S. Cl. ..................... 342/177; 342/179; 342/185; 342/186
[58] Field of Search ........... 342/177, 176, 179, 182, 342/183, 185, 186

[56] References Cited

U.S. PATENT DOCUMENTS

| 4,421,484 | 12/1983 | Wakeling et al. | 434/3 |
| 4,434,422 | 2/1984 | Kenol et al. | 342/185 |
| 4,547,803 | 10/1985 | Richards | 342/185 X |
| 4,829,308 | 5/1989 | Tol et al. | 342/185 |
| 4,833,475 | 5/1989 | Pease et al. | 342/185 |
| 4,845,501 | 7/1989 | Pease et al. | 342/185 |

Primary Examiner—John B. Sotomayor
Attorney, Agent, or Firm—Leonard Bloom

[57] ABSTRACT

A new architecture for the implementation of radar displays is provided which uses a mixed architecture superposing a PPI (Plan Position Indicator) type display on a raster display. The polar (analog) signal and the cartesian (digital) signal are displayed on the screen by means of suitable multiplexing and synchronization electronics so that the processor managing the screen "sees" a cartesian display, but the cartesian display is periodically interrupted and the polar display is interjected and is displayed in a polar format.

14 Claims, 4 Drawing Sheets

| RADIAL RESOLUTION AS PERCENTAGE OF PPI RADIUS (Dr %) | AMOUNT OF MEMORY PER BIT OF INFORMATION |
|---|---|
| 0.60 % | 27 K |
| 0.30 % | 109 K |
| 0.15 % | 434 K |

FIG. 2

| ANGULAR RESOLUTION (Dθ) | DISTANCE r FROM THE CENTER | |
|---|---|---|
| | R / 2 | R / 10 |
| 1.00 ° | 13 K | 321 K |
| 0.50 ° | 51 K | 1282 K |
| 0.10 ° | 1282 K | 32059 K |
| 0.05 ° | 5129 K | 128235 K |

FIG. 3

ARCHITECTURE FOR THE IMPLEMENTATION OF RADAR DISPLAYS

CROSS-REFERENCE TO RELATED APPLICATION

This application is a continuation of prior application Ser. No. 07/413,223, filed Sept. 27, 1989, now abandoned.

BACKGROUND OF THE INVENTION

1. Field of the Invention

The present invention relates to a new architecture for the implementation of radar displays, and more particularly to a mixed architecture superposing a PPI (Plan Position Indicator) type display on a raster display.

2. Description of the Background

Echo receiving systems such as radar and sonar usually comprise three fundamental elements:

(a) a cathode ray tube (CRT) that constitutes the interface device with the end user;

(b) a circuit for processing the echo-radar signal coming from the receiver. This circuit can modulate the brightness of the CRT electronic beam according to the received signal;

(c) a circuit for deflecting the electronic beam of the (CRT) which allows, through a mechanism of temporal scanning ("sweeps"), the building of an image on the screen according to the information provided by the above-described processing circuit.

A major problem arises in carrying out such systems because, due to operating requirements, it is necessary to display not only the sweeping image which is derived from an analog signal, but also alphanumeric and graphic information which representation is well-suited for a digital display system.

In other words, the radar signal is intrinsically of a polar (analog) type, while legends and vectors are managed by a processor in an intrinsically cartesian (digital) way.

Prior art radar display systems can be divided into three categories:

fully analog display systems which we will indicate as "ANALOG ARCHITECTURE";

fully digital display systems which we will indicate as "DIGITAL ARCHITECTURE".

the double beam CRT display system which we will indicate as "DOUBLE BEAM ARCHITECTURE".

In the case of "ANALOG ARCHITECTURE" systems only the radar echo signal is displayed on the screen in polar coordinates. Since every picture is composed of a finite sweep number, the obtained resolution is maximum at the center of the display screen and minimum near the screen boundary.

The dead time between two sweeps can be used to draw symbols and/or vectors. Normally these symbols are refreshed during such lead times in a cyclic sequence. The persistence time of the (CRT) phosphors places a limit on the maximum number of symbols and/or vectors which can be displayed, due to the flickering effect.

Therefore, although "ANALOG ARCHITECTURE" systems are simple in design because the systems maintain the polar nature of the information, difficulties arise when complex symbols or alphanumeric drawings have to be displayed.

In the case of "DIGITAL ARCHITECTURE" systems, the radar echo signal is sampled and stored in a digital memory which continuously outputs data to a CRT with a raster TV-like scan.

The "DIGITAL ARCHITECTURE" systems provide an image in which all the fields scanned by the antenna are constantly displayed at a uniform brightness. The "DIGITAL ARCHITECTURE" systems further allow easy drawing and/or symbol displays in a practically unbounded number. Furthermore, these systems allow the display of complex maps, and the use of colors.

Nevertheless, formatting an intrinsically polar signal for a cartesian framework leads inevitably to some drawbacks.

For instance, the samples of the radar signal must be stored in memory in real time. As the memory is generally organized as a bi-dimensional cartesian array, extremely fast calculations of products like $r \cos \theta$ and $r \sin \theta$ (where r is the echo distance and $\theta$ is its bearing) is required. Since the video memory is also used by the circuitry generating vectors and/or symbols and by the raster-scan circuitry, extremely fast video memories are required in order to avoid overall system performance reduction. Typically this problem is resolved with costly specialized hardware.

Also, due to the obvious memory bank size limitations, the image resolution is usually lower than that attainable with the analog architecture because the latter is limited only by video amplifier bandwidth, spot size and phosphor granularity. Since a radar operator is mainly interested in the distance and the angular position of an echo, it is necessary to divide the resolution error into two components: the Angular Resolution and the Radial Resolution.

FIG. 1 shows a quadrant of a radar display superimposed on a video memory grid.

The angular resolution $\Delta\theta$ is defined as the angle corresponding to the arc lying between two adjacent pixels (shaded cubes as shown in FIG. 1) on a circle of radius r. The angular resolution varies with respect to the distance from the center r and the angular position. In the worst case, at an angular position of 45°, it can be easily found that:

$$\Delta\theta = 2 \arcsin \frac{R\sqrt{2}}{r\sqrt{N}}$$

where R is the CRT radius and N is the total number of pixels which can be stored in video memory. Owing to the constant pixel density per unit area, the angular resolution is minimum at the center and maximum around the screen boundary. Indeed, it is possible to compute the amount of memory required to obtain a desired angular resolution at a distance of r=R/2 (typical) or r=R/10 (worst case). The results are shown in FIG. 2.

Note that the memory amount required to get an angular resolution of 0.5° at R/2 is equal to about 51 Kilobytes per bit of pixel. Since a compromise must be struck between cost and memory size, an inevitable sampling error arises.

The radial resolution (Dr) is defined as the maximum distance between two adjacent pixels on a radius normalized to the CRT radius length (R). The radial resolution is, in the worst case:

$$Dr = \frac{2R\sqrt{2}/\sqrt{N}}{R} = \frac{2\sqrt{2}}{\sqrt{N}}$$

where N is the total number of pixels in the pixel memory.

The pixel number, that is to say the memory amount required to get a desired radial resolution, can be easily derived. The results are shown in FIG. 3.

In practice, if two distinct points on a radius are separated from each other by only 0.3% of the CRT radius (about 500 meters in a 100 nautical mile range), a memory bank of about 109 Kilobytes per bit of information is required to resolve the points. In sum, the limit on symbols and/or vectors which can be displayed in an "ANALOG ARCHITECTURE" system, and the speed and memory required of a "DIGITAL ARCHITECTURE" system are significant problems.

A "DOUBLE BEAM ARCHITECTURE" has also been developed. This system uses both an "ANALOG ARCHITECTURE" system and a "DIGITAL ARCHITECTURE" system which generate two separate beams for driving a single CRT. The "DOUBLE BEAM ARCHITECTURE" is characterized by remarkable costs due to the necessity of employing special-purpose and/or particularly sophisticated components, so that it is only employed where the cost is less important than the maximum degree of safety.

SUMMARY OF THE INVENTION

Owing to the problems with the "ANALOG ARCHITECTURE" and "DIGITAL ARCHITECTURE" systems, it is an object of the present invention to provide a "MIXED ARCHITECTURE" which improves performance with respect to the amount of symbols and vectors which can be concurrently displayed on the screen (in comparison to the "ANALOG ARCHITECTURE") without fully implementing a "DIGITAL ARCHITECTURE" system with its inherent disadvantages.

It is another object of the invention to provide a "MIXED ARCHITECTURE" system which attains the same optimal results of the "DOUBLE BEAM ARCHITECTURE" without the prohibitively high implementation costs.

According to the present invention, the above-described and other objects are accomplished with a "MIXED ARCHITECTURE", that is to say "ANALOG" and "DIGITAL" multiplexed, which is a variation of the idea of presenting the information on two separate planes which are superimposed on a common single-beam (CRT). In practice, the polar signal and the cartesian signal are displayed on the screen by means of suitable multiplexing and synchronization electronics so that the processor managing the screen "sees" a cartesian display, while the echo signal coming from the antenna is displayed in a polar format.

In other words, the two different signals are processed with two different circuits, and the two resulting image are multiplexed together and the images appear superposed on the same (CRT). The following advantages accrue:

(a) The resolution on the polar plane is the same as that obtained by the "ANALOG ARCHITECTURE", that is, very high and limited only by video amplifier bandwidth, spot size and phosphor granularity.

(b) The resolution on the cartesian plane is irrelevant.

(c) A relative position error can be defined. It consists of the error made by an object moving on the cartesian plane which tries to superimpose itself on a point on the polar plane.

(d) The amount of memory required in the cartesian plane by this type of architecture, to obtain a given angular and radial resolution, so that one can satisfactorily pinpoint a target, can be easily derived according to the tables of FIGS. 2 and 4.

The above advantages are obtained by a temporal and spatial sampling of the radar video signal. As a result of the sampling, the echo resolution is absolutely independent of he symbol/vector memory size (in contrast to the "DIGITAL ARCHITECTURE"). As proof thereof, the number of pixels per circular ring sector is constant in the case of polar signal sampling, so the pixel density per unit area (Dp) can be expressed by the following formula:

$$Dp = \frac{Npnt * Nswp}{2\pi Rr}$$

where Npnt is the number of points on the radius, Nswp is the number of sweeps of the image, R is the CRT radius and r is the distance from the center. Therefore the capability of recognizing an object is dependant on the pixel density Dp which increases as the target approaches the center. This is more compatible with the operator requirements.

However, although a very high sampling resolution is not difficult to achieve in the polar display, it is difficult to get a similar resolution in the cartesian display due to the costs and design difficulties. Therefore, the "MIXED ARCHITECTURE" will commonly result in an error in the echo position estimate when trying to compute it by an overlaying symbol displayed by the cartesian display. This is not a significant problem because the echo signal always appears on the display in its "true" position and the operator can account for the error.

Conversely, in the case of the "DIGITAL ARCHITECTURE", the errors are the same in both the polar and cartesian displays, but the polar echo signal is forced "into" the cartesian array with rounding errors which the operator cannot account for.

The "MIXED ARCHITECTURE" system comprises: a receiver for receiving a reflected signal, a polar signal processor connected to the receiver for converting the reflected signal into a polar signal defining a first image, the polar signal being compatible for displaying the first image in a plan position indicator (PPI) display format, a cartesian signal processor connected to the receiver for generating a cartesian signal defining a second image, the cartesian signal being compatible for displaying the second image in a raster display format, a display connected to the polar signal processing means for receiving the polar signal and displaying the first image in a PPI format, the display also being connected to the cartesian signal processor for receiving the cartesian signal and displaying the second image in a raster format, the display further comprising a multiplexer for superposing the second displayed image on the first displayed image.

BRIEF DESCRIPTION OF THE DRAWINGS

Other objects, features and advantages of the present invention will become more apparent from the following detailed description of preferred embodiments and certain modifications thereof when taken together with the accompanying drawings, in which:

FIG. 2 is a table showing the amount of memory required to obtain a desired angular resolution at a distance of r=R/2 (typical) or r=R/10 (worst case).

FIG. 3 is a table showing the memory amount required to get a desired radial resolution.

DETAILED DESCRIPTION OF THE PREFERRED EMBODIMENT

Figure 4:
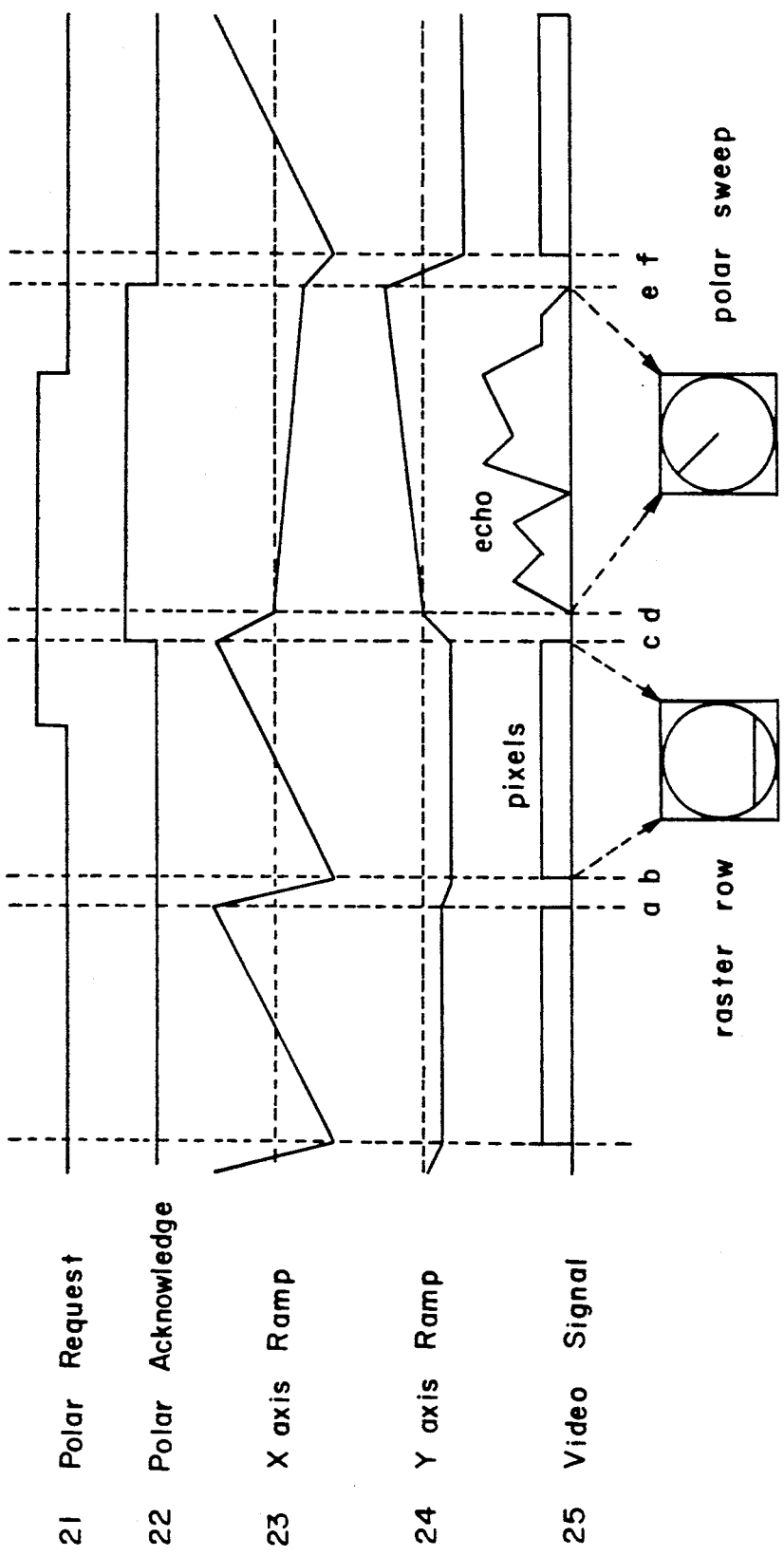
FIG. 4 illustrates the basic4 timing diagram of the "MIXED ARCHITECTURE" system according to the present invention.

In order to display both polar and cartesian images at the same time and on a single beam CRT, it is necessary to use time multiplexing of the signals driving the deflection devices and the video gun. This fundamental idea is implemented by periodically interrupting a raster TV-like scan which presents the symbols and/or vectors on the screen, and interspersing the raster-scan with a polar scan which presents the radar echo signals, as shown in FIG. 4. The raster-scan is interrupted at the initiation of a synchronized request and acknowledge scheme.

For this purpose a polar request signal 21 for the request of a polar sweep presentation can be employed; a synchronization circuit generates the polar request signal 21 and awaits return receipt of a polar acknowledge signal before interjecting the polar scan. In a preferred embodiment the raster scan is not interrupted until the row currently displayed has been completely scanned. This way it is not necessary to store information on the scan position within the row, but only on the vertical scan position of the current row within the frame. In this embodiment the waveforms for the horizontal (X AXIS RAMP) 23 and vertical (Y AXIS RAMP) 24 deflection signals are as shown in FIG. 4. The periodic interrupts of the "raster" presentation necessitate storage of the current value of the Y deflection (Time=c) so that the raster-scan can return to it immediately after the end of the polar presentation (Time=f). Note that dead times (a-b, c-d and e-f) are required due to the finite bandwidth of the system. The video signal 25 received by the cathode ray tube is made of cartesian "raster" rows interspersed with polar echo-radar signals.

Moreover, to attain a satisfactory end result without running into very hard-to-solve tuning problems, it is advantageous to share a common video amplifier and deflection amplifiers, as well as a CRT, between both the polar and cartesian planes. All this imposes significant design constraints.

In fact, although the raster deflection circuitry is typically fast enough, it provides only single sloped ramps with a maximum value that is always the same. On the contrary, the linear amplifiers used for polar PPIs work with variable slope-variable amplitude ramps which are generally rather "slow" and have long retrace times. In the present invention, the linear amplifier necessary for the "MIXED ARCHITECTURE" must provide variable slope-variable amplitude ramps having very low retrace times and no cross-over distortion.

Figure 5:
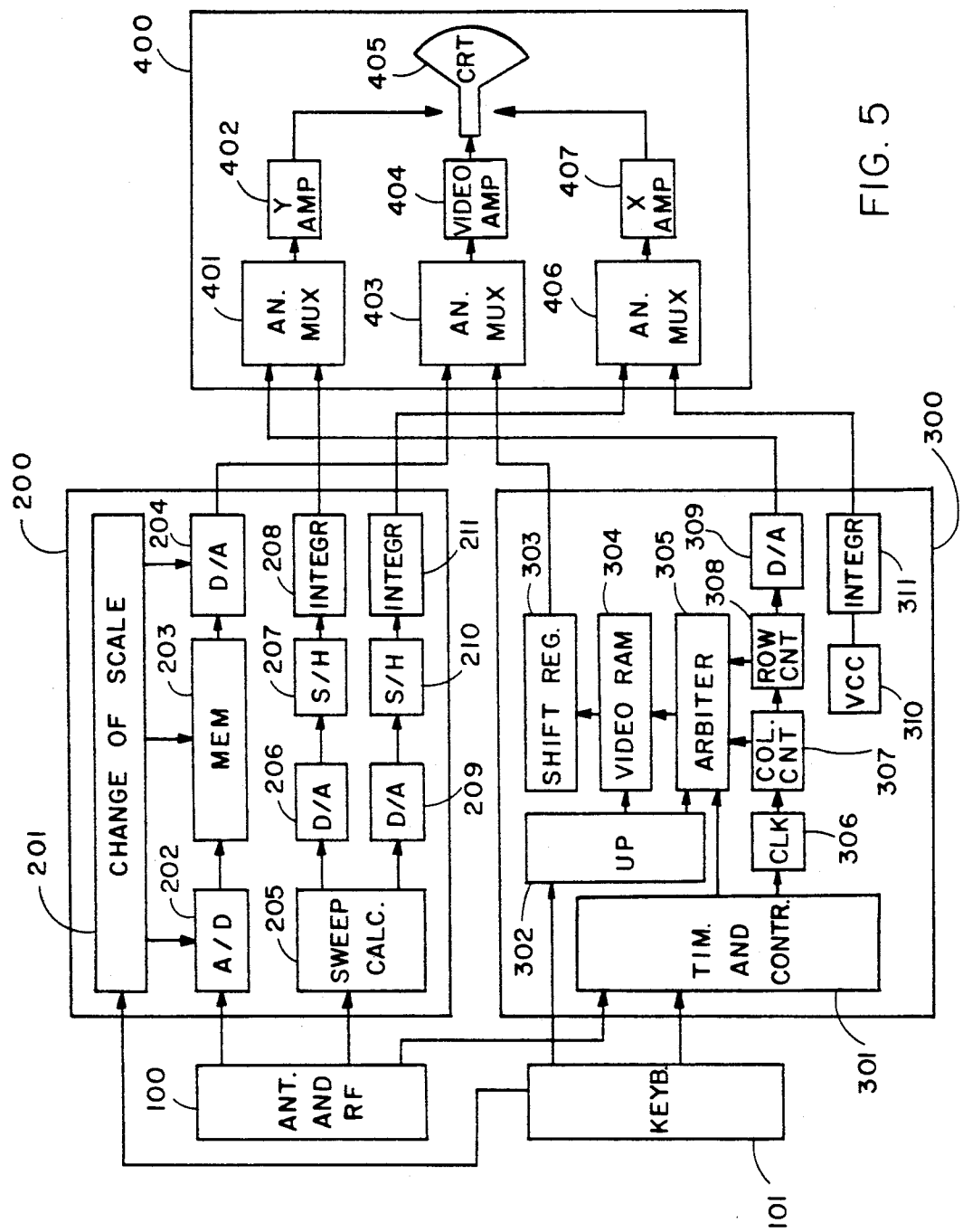
FIG. 5 is an overall block diagram of the "MIXED ARCHITECTURE" system according to the present invention.

FIG. 5 is a block diagram illustrating polar signal processing circuitry 200 and cartesian signal processing circuitry 300. The polar signal processing circuitry 200 receives the polar signal from the antenna (ANT & RF block) 100, along with other auxiliary data from the keyboard (KEYB) 101 (i.e. range change, etc. . . . ) the polar signal is first sampled by an analog-to-digital convertor 202 (A/D) and the polar coordinate data samples are then stored into a fast RAM memory 203 (MEM) wherein the echo duration and the sweep time can be altered, and then the altered polar coordinate data is converted back to an analog polar signal for presentation on the screen by digital-to-analog convertor 204 (D/A). The echo duration and the sweep time can be altered by a change of scale circuit 201 (CHANGE OF SCALE) which accesses RAM memory 203.

The deflection ramps of the polar signal are built by a sweep calculation circuit 205 (SWEEP CALC.) which stores a numerical table containing sampled values of sines and cosines of the antenna rotation angle. These stored values are converted into constant voltages by D/A convertors 206 and 209 and are then time integrated by integration circuits 208 and 211 to obtain the desired sweeps.

Cartesian signal processor 300 provides the digital image signal to the display circuit 400. A microprocessor 302 (uP) is used to perform such operations as symbol plotting, vector plotting, memory bank roto-translation, etc. . . .

The column counter 307 (COL CNT) and the row counters 308 (ROW CNT) are driven by a constant frequency signal generated by the clock 100 (CLOCK), and quickly scan the video RAM 304 (VIDEO RAM) to output the pixels stored therein to the cathode ray tube 405 (CRT) through a shift register 303 (SHIFT REG.) following a conventional raster-scanning concept. Notice that the row counter output is used to generate the current value of the Y axis ramp 24 of the cartesian signal so that this ramp can be easily interrupted without loss of information in order to interject a polar display sweep.

As shown in FIG. 5, in order for both the microprocessor 302 (uP) and the raster scan circuitry 307 and 308 (COL CNT and ROW CNT) to have simultaneous access to the video RAM 304 (VIDEO RAM), an arbiter circuit 305 (ARBITER) is normally needed to avoid undesirable display effects. A simple (X) direction integrator 311 (INTEGR Block) is used to generate the raster ramps. Integrator 311 is driven by a constant signal produced by voltage source 310 (Vcc Block). A stepwise generator is constructed using a digital-to-analog-converter 309 (D/A Block) for the (Y) direction. All these above-described cartesian signal processor 300 circuits are controlled and coordinated by a timing and control circuit 301 (TIM. & CONTR.).

Figure 1:
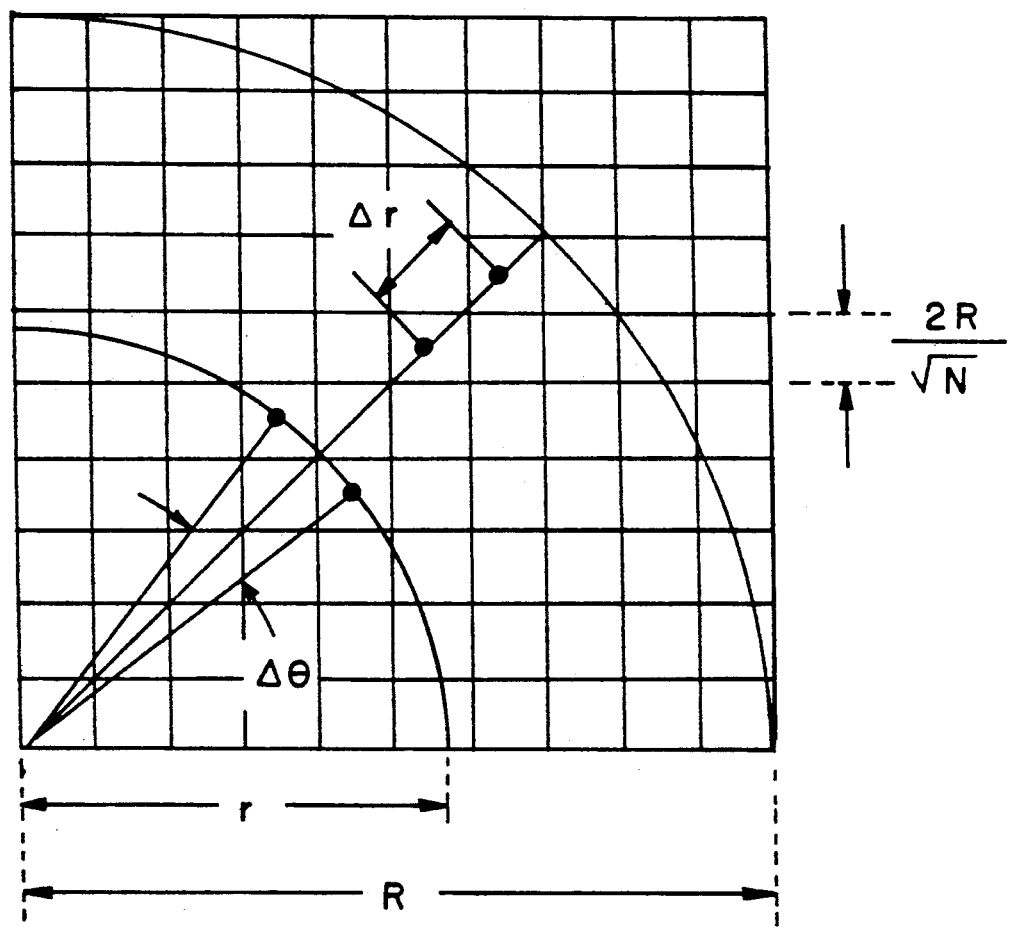
FIG. 1 shows a quadrant of a radar display superimposed on a video memory grid.

On the right side of FIG. 1, the a block diagram of the display circuitry 400 including cathode ray tube 405 (CRT) is shown. Display circuit 400 also contains the magnetic deflection yoke (not shown), its amplifiers 402 and 407 (X AMP. and Y AMP.) which are designed with the criteria described above, and the video amplifier 404 (VIDEO AMP.).

Notice that the CRT driving signals which come from the polar and cartesian processors are time multiplexed by multiplexer circuits 401 and 406 (AN. MUX).

Likewise, the video signal 25 is amplified by the video amplifier 404 (VIDEO AMP.).

The disclosed invention uses a single-beam CRT and, generally speaking, stock electronic components which help to keep down the production costs, and minimize the weight and size of the system. The method of temporarily interrupting the cartesian display while presenting the polar plane lends itself to the use of low cost processors which need not be particularly fast in managing rotations, translations and/or rescaling of memorized maps. Furthermore, reliability is increased by such proven components. All this makes the "MIXED ARCHITECTURE" particularly attractive and well suited for cost-sensitive markets, especially the marine civil navigation.

Moreover, with the cartesian display, it is possible to superimpose previously stored maps of interesting areas on the polar image which is currently being displayed (e.g. Maps for harbor entrances, channels, etc.).

Another interesting potential of a system based on the "MIXED ARCHITECTURE" is obtained in the field of measures. The classical presentation of a VRM (VARIABLE RANGE MARK) and EBL (ELECTRONIC BEARING LINE) lends itself to an analog architecture, but it is an exercise in geometry for the operator. With a mixed architecture radar, it becomes easy to measure angles and distances by means of vectors traced on the screen between the points of interest, and the tracing can be accomplished by pointing devices such as joystick, trackballs, etc.. Thus, ease of use and speed of measure can be obtained.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. For example, the invention may be applied in sonar displays, electro-medical devices, echographs, sectional radiography, etc. It is to be understood, therefore, that within the scope of the appended claims, the invention may be practiced otherwise than as specifically set forth herein.

We claim:

1. In an echo receiving system which receives an echo signal and generates a corresponding first video signal defining a polar plan image of said echo signal, and which generates a second signal defining a cartesian plan image of auxiliary information about said polar plan image, a display apparatus, comprising:
   a video display monitor;
   control means connected to said echo receiving system and said video display monitor for operating said video display with said second signal in a raster format, thereby displaying said cartesian plan image, and for periodically interrupting said raster operation to intersperse said first video signal, thereby interleaving said polar plan image, whereby said polar plan and cartesian plan images appear as a single image on said video display monitor.

2. The display apparatus according to claim 1, wherein said control means further comprises,
   means for storing a current raster position when said raster operation is interrupted, and
   means for resuming said raster operation at said stored raster position after said interspersing of said first video signal.

3. The display apparatus according to claim 2, wherein said control means further comprises,
   means for storing a current position of said polar plan image when said raster operation is resumed, and
   means for resuming display of said polar plan image at said stored position when said raster operation is again interrupted.

4. The display apparatus according to claim 3, wherein said control means further comprises,
   means for issuing a request indicating that said first video signal is ready to be interspersed, and
   means for acknowledging said request,
   whereby said control means interrupts said raster operation to intersperse said first video signal in accordance with a request-acknowledge protocol.

5. The display apparatus according to claim 4, wherein said video display monitor further comprises an X-deflection amplifier, a Y-deflection amplifier, and a video amplifier, each adapted for displaying both said polar image and said cartesian image.

6. The display apparatus according to claim 5, further comprising a keyboard for allowing an operator to define said cartesian plan image, and for allowing an operator to specify a scale of said polar plan image.

7. The display apparatus according to claim 6, wherein said control means further comprises,
   a video ram for storing said second signal defining said cartesian plan image.

8. The display apparatus according to claim 7, wherein said control means further comprises,
   a processor connected to said keyboard for managing and updating said second signal stored in said video ram.

9. The display apparatus according to claim 8, wherein said control means further comprises,
   timing means connected to said echo receiving system and to said keyboard for synchronizing the periodic interruption of said raster operation and interspersing of said first video signal.

10. The display apparatus according to claim 9, wherein said control means further comprises
    a row counter communicating with said timing means for specifying a row of said video ram to be accessed during said raster operation, and for storing a row address of said video ram when said timing control circuit interrupts the raster operation for interspersing said first video signal, and
    a column counter communicating with said timing means for specifying a column of said video ram to be accessed during said raster operation,
    whereby said timing means interrupts said raster operation after a row of said video ram has been scanned, and said stored row address indicates a row of said video ram to resume said raster operation after said first video signal has been interspersed.

11. The display apparatus according to claim 10, wherein said control means further comprises,
    arbitrating means connected between said row and column counters and said video ram, and connected between said processor and said video ram for controlling access to said video ram by said row and column counters and said processor.

12. The display apparatus according to claim 11, wherein said control means further comprises multiplexing means for interspersing said first video signal in said second video signal, whereby said polar plan and cartesian plan images appear as a single image on said video display monitor.

13. A method for concurrently displaying a plurality of video signals including a first video signal defining a polar plan image, and a second video signal defining a cartesian plan image of auxiliary information about said polar plan image, the method comprising the steps of:

operating a video display monitor with said second video signal in a raster format, thereby displaying said cartesian plan image;

periodically interrupting said raster operation to intersperse said first video signal, thereby interleaving said polar plan image;

whereby said polar plan and cartesian plan images appear as a single image on said video display monitor.

14. The method according to claim 13, further comprising the steps of storing data indicating a last position of said raster operation when said raster operation is interrupted, and resuming said raster operation at said stored position after said first video signal has been interspersed.

* * * * *